(12) United States Patent
Boston

(10) Patent No.: US 9,884,273 B2
(45) Date of Patent: Feb. 6, 2018

(54) FLUID FILTER ASSEMBLY INCORPORATING DRAWN DOWN COVER PLATE

(71) Applicant: West Troy, LLC, Troy, OH (US)

(72) Inventor: Sean Boston, Troy, OH (US)

(73) Assignee: West Troy, LLC, Troy, OH (US)

( * ) Notice: Subject to any disclaimer, the term of this patent is extended or adjusted under 35 U.S.C. 154(b) by 114 days.

(21) Appl. No.: 14/800,248

(22) Filed: Jul. 15, 2015

(65) Prior Publication Data

US 2016/0023134 A1    Jan. 28, 2016

Related U.S. Application Data

(60) Provisional application No. 62/028,515, filed on Jul. 24, 2014.

(51) Int. Cl.
| | |
|---|---|
| *B01D 27/06* | (2006.01) |
| *F01M 11/03* | (2006.01) |
| *B01D 27/08* | (2006.01) |

(52) U.S. Cl.
CPC ............. *B01D 27/08* (2013.01); *F01M 11/03* (2013.01); *B01D 2201/302* (2013.01)

(58) Field of Classification Search
None
See application file for complete search history.

(56) References Cited

U.S. PATENT DOCUMENTS

| 758,377 A | 4/1904 | Miller |
|---|---|---|
| 2,564,023 A | 8/1951 | Miller |
| 2,870,576 A | 1/1959 | Parker |
| 3,132,097 A | 5/1964 | Tietz |
| 3,224,591 A | 12/1965 | Sawyer |

(Continued)

FOREIGN PATENT DOCUMENTS

| GB | 2100140 A | 12/1982 |
|---|---|---|
| JP | 09133233 | 5/1997 |

(Continued)

OTHER PUBLICATIONS

Search Report for International Application No. PCT/US2011/048363 dated Mar. 21, 2012.

*Primary Examiner* — Thomas M Lithgow
(74) *Attorney, Agent, or Firm* — Dinsmore & Shohl LLP

(57) ABSTRACT

A fluid filter assembly is provided comprising a filter can, a filter cover assembly, and an interior filtering assembly. The filter cover assembly comprises an outer cover plate and an inner mounting plate. The outer cover plate of the filter cover assembly comprises a drawn-down portion that descends toward the interior volume of the fluid filter assembly and exhibits a metallic grain structure that is stretched relative to the metallic grain structure of the inner and outer circumferential mating portions of the outer cover plate. In one embodiment, the inner mounting plate is secured to a backside of the outer cover plate such that, upon rotational engagement of the internal threads of the inner mounting plate with a threaded fluid port, the inner mounting plate rotates with the filter can and the outer cover plate to advance in an axial engagement direction and forcibly urge the outer cover plate in the axial engagement direction from the backside of the outer cover plate.

19 Claims, 1 Drawing Sheet

(56) References Cited

U.S. PATENT DOCUMENTS

| | | |
|---|---|---|
| 3,263,701 A | 8/1966 | Johnson |
| 3,265,213 A * | 8/1966 | Decker ............... B01D 27/005 210/136 |
| 3,335,751 A | 8/1967 | Davis, Jr. |
| 3,411,632 A | 11/1968 | Offer et al. |
| 3,616,933 A | 11/1971 | Baldwin |
| 3,794,170 A | 2/1974 | Yamaguchi |
| 3,807,561 A | 4/1974 | Cullis |
| 4,045,349 A | 8/1977 | Humbert, Jr. |
| 4,129,144 A | 12/1978 | Andersson et al. |
| 4,168,237 A | 9/1979 | Pickett et al. |
| 4,175,097 A | 11/1979 | McEntire |
| 4,314,903 A | 2/1982 | Hanley |
| 4,400,864 A | 8/1983 | Peyton et al. |
| 4,421,444 A | 12/1983 | Hanley |
| 4,473,471 A | 9/1984 | Robichaud et al. |
| 4,935,127 A | 6/1990 | Lowsky et al. |
| 4,990,247 A | 2/1991 | Vandenberk |
| 5,250,176 A | 10/1993 | Daniel |
| 5,362,390 A | 11/1994 | Widenhoefer et al. |
| 5,374,355 A | 12/1994 | Habiger et al. |
| 5,490,930 A | 2/1996 | Krull |
| 6,202,859 B1 | 3/2001 | Langsdorf et al. |
| 6,284,130 B1 | 9/2001 | Daniel |
| 6,345,721 B1 | 2/2002 | Durre et al. |
| 6,349,836 B1 | 2/2002 | Langsdorf et al. |
| 6,468,425 B2 | 10/2002 | Reinhart |
| 6,595,372 B1 | 7/2003 | Minowa et al. |
| 6,610,203 B1 | 8/2003 | Jainek |
| 6,615,989 B2 | 9/2003 | Brown et al. |
| 7,934,617 B2 | 5/2011 | Minowa et al. |
| 8,685,243 B2 | 4/2014 | Bilski et al. |
| 8,757,200 B2 | 6/2014 | Davidson et al. |
| 2002/0030007 A1 | 3/2002 | Koh |
| 2003/0015240 A1 | 1/2003 | Nelson et al. |
| 2005/0103386 A1 | 5/2005 | Magda |
| 2006/0137316 A1 | 6/2006 | Krull et al. |
| 2006/0201556 A1 | 9/2006 | Hamza |
| 2010/0108589 A1 | 5/2010 | Frye et al. |
| 2014/0299205 A1 | 10/2014 | Boston |

FOREIGN PATENT DOCUMENTS

| | | |
|---|---|---|
| WO | 9511072 | 4/1995 |
| WO | 2010062666 A2 | 6/2010 |

* cited by examiner

FLUID FILTER ASSEMBLY INCORPORATING DRAWN DOWN COVER PLATE

CROSS-REFERENCE TO RELATED APPLICATIONS

This application claims the benefit of U.S. Provisional Application Ser. No. 62/028,515 entitled FLUID FILTER WITH FILTER MOUNTING COVER, filed Jul. 24, 2014.

BACKGROUND

The present disclosure relates to fluid filter assemblies and, more particularly, to a filter cover assembly for use therein.

BRIEF SUMMARY

In accordance with one embodiment of the present disclosure, a fluid filter assembly is provided comprising a filter can, a filter cover assembly, and an interior filtering assembly. The filter cover assembly is positioned over the open end of the filter can such that the filter can and the filter cover collectively bound an interior volume of the fluid filter assembly. The filter cover assembly comprises an outer cover plate and an inner mounting plate. The outer cover plate of the filter cover assembly comprises an outer circumferential mating portion, an inner circumferential mating portion, and a drawn-down portion extending between the outer circumferential mating portion and the inner circumferential mating portion. The outer circumferential mating portion of the outer cover plate is engaged with the circumferential can edge of the filter can. The inner circumferential mating portion of the outer cover plate is engaged with the inner mounting plate. The inner mounting plate comprises an inner fluid orifice in communication with the interior filtering assembly. The outer cover plate comprises a plurality of outer fluid orifices in communication with the interior filtering assembly. The drawn-down portion of the outer cover plate descends toward the interior volume of the fluid filter assembly for a majority of the cover plate expanse and exhibits a metallic grain structure that is stretched relative to the metallic grain structure of the inner and outer circumferential mating portions of the outer cover plate.

In accordance with another embodiment of the present disclosure, the inner mounting plate, which is separate and distinct from the outer cover plate, is provided with internal threads that define an axial engagement direction. The inner mounting plate is secured to a backside of the outer cover plate such that, upon rotational engagement of the internal threads of the inner mounting plate with a threaded fluid port, the inner mounting plate rotates with the filter can and the outer cover plate to advance in an axial engagement direction and forcibly urge the outer cover plate in the axial engagement direction from the backside of the outer cover plate.

Although the concepts of the present disclosure are described herein with primary reference to cylindrical can filters, such as those used to filter automotive engine oil, it is contemplated that the concepts will enjoy applicability to any type of fluid filter including, for example, hydraulic fluid filters, water filters, gasoline filters, fuel oil filters, transmission fluid filters, etc.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
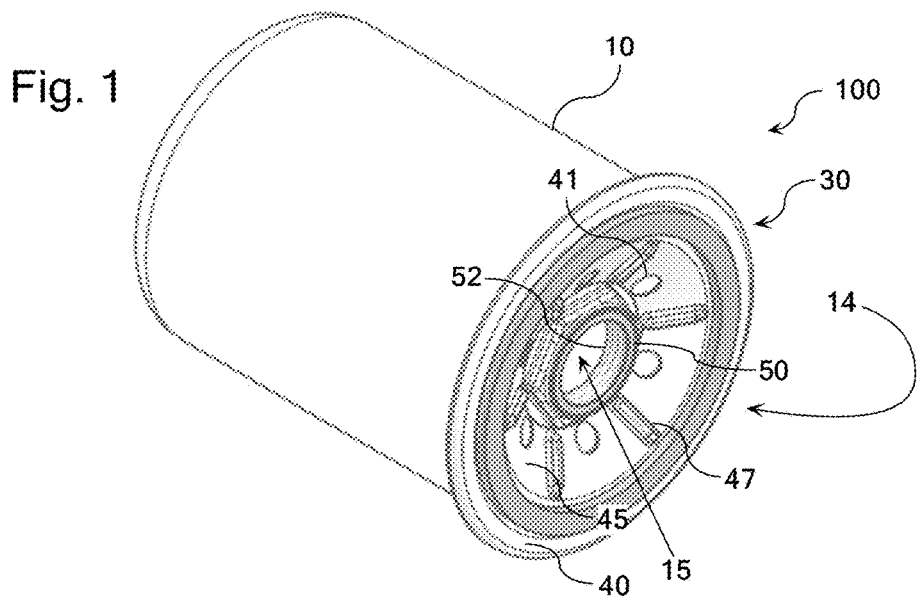
FIG. 1 is an isometric illustration of a filter assembly according to one embodiment of the present disclosure.

FIGS. 1-5 collectively illustrate a fluid filter assembly 100 according to one contemplated embodiment of the present disclosure. The fluid filter assembly 100 comprises a filter can 10, an interior filtering assembly 20, and a filter cover assembly 30 comprising an outer cover plate 40 and an inner mounting plate 50.

Figure 4:
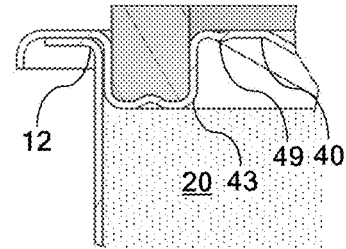
FIG. 4 is a cross sectional illustration of an outer circumferential portion of a filter assembly according to one embodiment of the present disclosure.

Referring specifically to FIGS. 1 and 4, the filter can 10 comprises a circumferential can edge 12 that defines an open end 14 of the filter can 10. The filter cover assembly 30 is positioned over the open end 14 of the filter can 10 such that the filter can 10 and the filter cover 30 collectively bound an interior volume 15 of the fluid filter assembly 100. The interior filtering assembly 20 is positioned in the interior volume 15 of the fluid filter assembly 100. The inner mounting plate 50 comprises an inner fluid orifice 52 in communication with the interior filtering assembly 20. The outer cover plate 40 comprises a plurality of outer fluid orifices 41 in communication with the interior filtering assembly 20. Typically, the inner fluid orifice 52 of the inner mounting plate 50, the outer fluid orifices 41 of the outer cover plate 40, and the interior filtering assembly 20 cooperate to define a fluid filter path extending from the outer fluid orifices 41 as a fluid inlet, through the interior filtering assembly 20, and to the inner fluid orifice 52 as a filtered fluid outlet. The interior filtering assembly 20 is not illustrated in detail because its particular design and configuration are beyond the scope of the present disclosure and application does not wish to limit the content of the present disclosure to one particular filtering assembly configuration. For reference, it is contemplated that a filtering assembly as illustrated in US PG Pub. No. 2008/0087590 A1, may be utilized in the fluid filter assembly 100 of the present disclosure.

Figure 2:
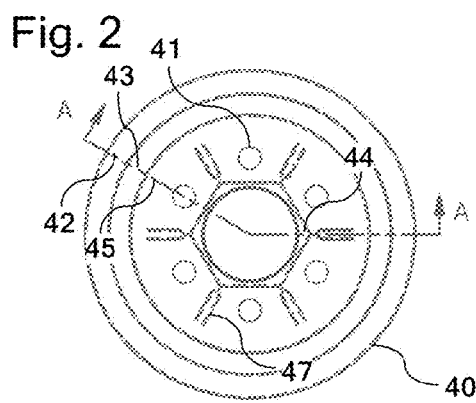
FIG. 2 is a plan view of an outer cover plate according to one embodiment of the present disclosure.
Figure 3:
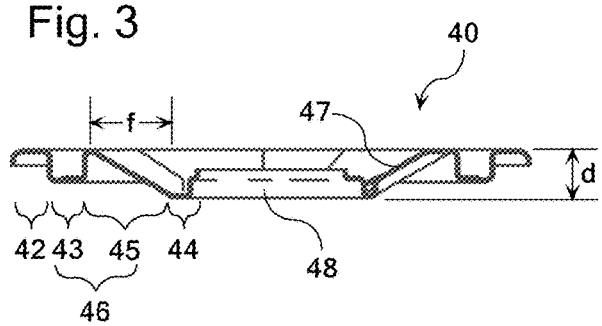
FIG. 3 is a cross sectional illustration of the outer cover plate of FIG. 2, taken along section line A-A.

Referring further to FIGS. 2 and 3, the outer cover plate 40 of the filter cover assembly 30 comprises an outer circumferential mating portion 42, an inner circumferential mating portion 44, and a drawn-down portion 45 extending between the outer circumferential mating portion 42 and the inner circumferential mating portion 44. The outer circumferential mating portion 42 of the outer cover plate 40 is engaged with the circumferential can edge 12 of the filter can 10. In some cases, it may be preferable to ensure that outer circumferential mating portion 42 of the outer cover plate 40 is structurally configured to complement a can hem formed at the circumferential can edge 12. For the purposes of defining and describing the present invention, it is noted that, in this context, the term "between" is not introduced to imply that the drawn-down portion 45 of the outer cover plate 40 extends from the outer circumferential mating portion 42 to the inner circumferential mating portion 44. Rather, the drawn-down portion 45 is merely located somewhere between the inner and outer mating portions of the outer cover plate 40.

As is illustrated in FIGS. 2, 3, and 4, the outer cover plate 40 of the filter cover assembly 30 may be provided with a circumferential seal nesting portion 43 positioned radially between the outer circumferential mating and drawn-down portions 44, 45 of the outer cover plate 40 the fluid filter assembly 100 further comprises a sealing ring 60 positioned in the circumferential seal nesting portion 43 of the filter cover assembly 30. The drawn-down portion 45 of the outer cover plate 40 may be configured to extend from the circumferential seal nesting portion 43 to the inner circumferential mating portion 44.

The inner circumferential mating portion 44 of the outer cover plate 40 is engaged with the inner mounting plate 50. The outer cover plate 40 defines a cover plate expanse 46 that extends from its outer circumferential mating portion 42 to its inner circumferential mating portion 44. The drawn-down portion 45 of the outer cover plate 40 descends toward the interior volume 15 of the fluid filter assembly 100 for a majority of the cover plate expanse 46 and exhibits a metallic grain structure that is stretched relative to the metallic grain structure of the outer and inner circumferential mating portions 42, 44 of the outer cover plate 40. The aforementioned descendancy may be substantially continuous; in which case, it is contemplated that the drawn-down portion 45 may comprise surface variations, like the aforementioned strengthening discontinuities and outer fluid orifices 41, that interrupt the descendancy of the drawn-down portion 45 of the outer cover plate 40. For the purposes of defining and describing the present invention, it is noted that the descendancy will be "substantially" continuous in these circumstances as long as the surface variations do not result in a change in the basic strengthening functionality of the drawn-down portion 45 of the outer cover plate 40.

It is contemplated that the drawn-down portion 45 of the outer cover plate 40 may be formed by deep drawing, which is a manufacturing process in which sheet metal is progressively formed into a three-dimensional shape through the mechanical action of a die forming the metal around a punch. The deep draw metal stamping process work hardens the metal, resulting in a seamless finished part that is stronger than the base material. Deep drawing can produce precise and intricate, symmetrical or asymmetrical parts, and a variety of conventional and yet-to-be developed deep drawing techniques may be utilized to form outer cover plates according to the present disclosure. For example, and not by way of limitation, those practicing the concepts of the present disclosure may refer to conventional and yet-to-be developed teachings on deep draw manufacturing for teachings related to specific materials used in a deep draw process, characteristics of deep drawn stampings, types of deep draw presses, and information on deep draw station types.

Generally, it is noted that many different metals can be deep drawn including, for example, cold rolled steel, stainless steel, copper, brass, aluminum, and others. In one embodiment, the outer cover plate is fabricated from tin plated steel. Deep drawn metal stampings typically exhibit some wall thickness variation. For example, it is contemplated that the drawn-down portion 45 of the outer cover plate 40 may define a reduced thickness relative to the outer and inner circumferential mating portions 42, 44 of the outer cover plate 40. It is contemplated that this reduced thickness will typically be attributable to the draw down fabrication of the outer cover plate 40, as opposed to other aspects of the manufacturing processes used to form the filter cover assembly 30. Additionally, it is noted that, as raw material is formed into shapes through the deep drawing process, the grain structure is stretched and cold worked, which generates improved material strength properties. This work hardening results in a finished part that exhibits more strength than the base material used in its production.

Referring specifically to FIG. 3, it is noted that the outer and inner circumferential mating portions 42, 44 of the outer cover plate 40 often define a sheet thickness of between about 0.008" (0.2 mm) and about 0.030" (0.75 mm). Given the low structural strength and rigidity commonly associated with these relatively small sheet thicknesses, it may often be preferable to provide sufficient strengthening by ensuring that the drawn-down portion 45 of the outer cover plate 40 is configured as a truncated cone, descends substantially continuously over substantially all of the cover plate expanse 46, and defines a draw depth d that is at least 50% of the radial draw footprint f.

Figure 5:
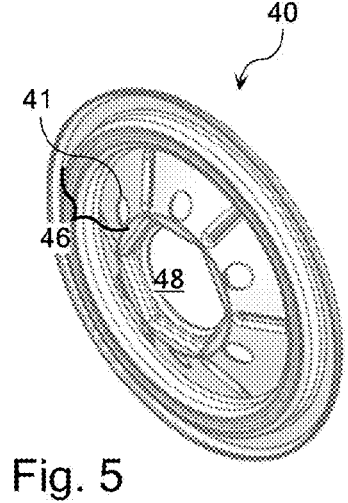
FIG. 5 is a back side isometric illustration of an outer cover plate according to one embodiment of the present disclosure.

As is illustrated in FIGS. 1, 2 and 5, the drawn-down portion 45 of the outer cover plate 40 may comprise the outer fluid orifices 41, which are in communication with the interior filtering assembly 20. In addition, the drawn-down portion 45 of the outer cover plate 40 may be provided with a plurality of radially or circumferentially extending strengthening discontinuities in the form of, for example, radially extending strengthening ribs 47 or a circumferentially extending strengthening rib 49. It is noted that, although the circumferentially extending strengthening rib 49 illustrated in FIG. 4 is positioned slightly outside of the truncated cone of the drawn-down portion 45, it may alternatively or additionally be positioned on the truncated cone of the drawn-down portion 45. Preferably, the strengthening discontinuities 47, 47 will be positioned well clear of the outer fluid orifices 41, to permit filtering assembly sealing members to be positioned about the outer fluid orifices 41.

Referring to FIGS. 1, 3, and 5, it is noted that the inner circumferential mating portion 44 of the outer cover plate 40 may be configured to define a recess 48 that ascends relative to the descendancy of the drawn-down portion 45. This recess 48 can be structurally configured to accommodate the inner mounting plate 50 of the filter cover assembly 30, which may be press fit, welded, or otherwise secured to the outer cover plate 40 within the recess 48. It is further contemplated that the inner mounting plate 50, which is typically separate and compositionally distinct from the outer cover plate 40, may comprise a threaded fastening device, e.g., a hex nut, and that the recess 48 may be configured as a hexagonal recess.

The internal threads of the inner mounting plate 50 define an axial engagement direction and the inner mounting plate 50 is secured to a backside of the outer cover plate 40 such that, upon rotational engagement of the internal threads of the inner mounting plate 50 with a threaded fluid port, the inner mounting plate 50 rotates with the filter can 10 and the outer cover plate 40 to advance in an axial engagement direction and forcibly urge the outer cover plate 40 in the axial engagement direction from the backside of the outer cover plate 40. This configuration helps ensure secure engagement of the inner mounting plate 50 to the outer cover plate 40.

It is noted that recitations herein of "a" component, "an" element, etc., should not be used to create an inference that the component, element, etc., is limited to a single occurrence thereof. For example, reference herein to "an" inner fluid orifice should not be interpreted to denote the presence of only a single inner fluid orifice, as more may be provided.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A fluid filter assembly comprising a filter can, a filter cover assembly, and an interior filtering assembly, wherein:
    the filter can comprises a circumferential can edge defining an open end of the filter can;
    the filter cover assembly is positioned over the open end of the filter can such that the filter can and the filter cover collectively bound an interior volume of the fluid filter assembly;
    the interior filtering assembly is positioned in the interior volume of the fluid filter assembly;
    the filter cover assembly comprises an outer cover plate and an inner mounting plate;
    the outer cover plate of the filter cover assembly comprises an outer circumferential mating portion, an inner circumferential mating portion, and a drawn-down portion extending between the outer circumferential mating portion and the inner circumferential mating portion;
    the outer circumferential mating portion of the outer cover plate is engaged with the circumferential can edge of the filter can;
    the inner circumferential mating portion of the outer cover plate is engaged with the inner mounting plate;
    the inner mounting plate comprises an inner fluid orifice in communication with the interior filtering assembly;
    the outer cover plate comprises a plurality of outer fluid orifices in communication with the interior filtering assembly; and
    the outer cover plate defines a cover plate expanse extending from its outer circumferential mating portion to its inner circumferential mating portion and the drawn-down portion of the outer cover plate (i) descends toward the interior volume of the fluid filter assembly for a majority of the cover plate expanse and (ii) exhibits a metallic grain structure that is stretched relative to the metallic grain structure of the inner and outer circumferential mating portions of the outer cover plate.

2. A fluid filter assembly as claimed in claim 1 wherein:
    the drawn-down portion of the outer cover plate comprises a truncated cone defining a radial draw footprint over which the drawn-down portion descends; and
    the drawn-down portion of the outer cover plate defines a draw depth that is at least 50% of the radial draw footprint.

3. A fluid filter assembly as claimed in claim 1 wherein the drawn-down portion of the outer cover plate descends substantially continuously toward the interior volume of the fluid filter assembly and defines a reduced thickness relative to the inner and outer circumferential mating portions of the outer cover plate.

4. A fluid filter assembly as claimed in claim 3 wherein substantially all of the reduced thickness of the drawn-down portion of the outer cover plate is attributable to draw down fabrication of the outer cover plate.

5. A fluid filter assembly as claimed in claim 3 wherein the inner and outer circumferential mating portions of the outer cover plate define a sheet thickness of between about 0.008" (0.2 mm) and about 0.030" (0.75 mm).

6. A fluid filter assembly as claimed in claim 1 wherein the drawn-down portion of the outer cover plate descends toward the interior volume of the fluid filter assembly for substantially all of the cover plate expanse extending from the outer circumferential mating portion to the inner circumferential mating portion of the outer cover plate.

7. A fluid filter assembly as claimed in claim 1 wherein the drawn-down portion of the outer cover plate comprises the outer fluid orifices in communication with the interior filtering assembly.

8. A fluid filter assembly as claimed in claim 1 wherein the drawn-down portion of the outer cover plate comprises a plurality of radially or circumferentially extending strengthening discontinuities.

9. A fluid filter assembly as claimed in claim 8 wherein the strengthening discontinuities comprise radially extending strengthening ribs.

10. A fluid filter assembly as claimed in claim 1 wherein the outer circumferential mating portion of the outer cover plate is structurally configured to complement a can hem formed at the circumferential can edge.

11. A fluid filter assembly as claimed in claim 1 wherein the inner circumferential mating portion of the outer cover plate defines a recess that ascends relative to the descendancy of the drawn-down portion and is structurally configured to accommodate the inner mounting plate of the filter cover assembly.

12. A fluid filter assembly as claimed in claim 1 wherein the inner mounting plate of the filter cover assembly is press fit, welded, or otherwise secured to the outer cover plate within the recess of the inner circumferential mating portion of the outer cover plate.

13. A fluid filter assembly as claimed in claim 1 wherein the outer cover plate of the filter cover assembly further comprises a circumferential seal nesting portion positioned radially between the outer circumferential mating and drawn-down portions of the outer cover plate.

14. A fluid filter assembly as claimed in claim 13 wherein the fluid filter assembly further comprises a sealing ring positioned in the circumferential seal nesting portion of the filter cover assembly.

15. A fluid filter assembly as claimed in claim 13 wherein the drawn-down portion of the outer cover plate extends from the circumferential seal nesting portion to the inner circumferential mating portion.

16. A fluid filter assembly as claimed in claim 1 wherein the inner mounting plate of the filter cover assembly comprises a threaded fastening device.

17. A fluid filter assembly as claimed in claim 1 wherein the inner mounting plate and the outer cover plate are separate and compositionally distinct components of the fluid filter assembly.

18. A fluid filter assembly as claimed in claim 1 wherein internal threads of the inner mounting plate define an axial engagement direction and the inner mounting plate is secured to a backside of the outer cover plate such that, upon rotational engagement of the internal threads of the inner mounting plate with a threaded fluid port, the inner mounting plate rotates with the filter can and the outer cover plate to advance in an axial engagement direction and forcibly urge the outer cover plate in the axial engagement direction from the backside of the outer cover plate.

19. A fluid filter assembly as claimed in claim 1 wherein the inner fluid orifice of the inner mounting plate, the outer fluid orifices of the outer cover plate, and the interior filtering assembly cooperate to define a fluid filter path extending from the outer fluid orifices as a fluid inlet, through the interior filtering assembly, and to the inner fluid orifice as a filtered fluid outlet.

\* \* \* \* \*